United States Patent
Liu et al.

(10) Patent No.: US 10,521,945 B2
(45) Date of Patent: Dec. 31, 2019

(54) TEXT-TO-ARTICULATORY MOVEMENT

(71) Applicant: International Business Machines Corporation, Armonk, NY (US)

(72) Inventors: Wen Liu, Beijing (CN); Qin Shi, Beijing (CN); Shi Lei Zhang, Beijing (CN); Peng Cheng Zhu, Shanghai (CN)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 15/389,502

(22) Filed: Dec. 23, 2016

(65) Prior Publication Data

US 2018/0182151 A1    Jun. 28, 2018

(51) Int. Cl.
| | |
|---|---|
| *G06T 13/20* | (2011.01) |
| *G06F 17/28* | (2006.01) |
| *G10L 13/08* | (2013.01) |
| *G10L 13/10* | (2013.01) |
| *G10L 13/04* | (2013.01) |

(52) U.S. Cl.
CPC ........ *G06T 13/205* (2013.01); *G06F 17/2836* (2013.01); *G10L 13/08* (2013.01); *G10L 13/04* (2013.01); *G10L 13/10* (2013.01)

(58) Field of Classification Search
None
See application file for complete search history.

(56) References Cited

U.S. PATENT DOCUMENTS

| | | | |
|---|---|---|---|
| 2004/0193398 A1* | 9/2004 | Chu | G10L 13/08 704/3 |
| 2010/0082345 A1 | 4/2010 | Wang et al. | |
| 2013/0262096 A1 | 10/2013 | Wilhelms-Tricarico et al. | |
| 2016/0093289 A1* | 3/2016 | Pollet | G10L 13/027 704/260 |
| 2016/0189710 A1* | 6/2016 | Hong | G10L 15/02 704/235 |

OTHER PUBLICATIONS

Ling, Zhen-Hua, Korin Richmond, and Junichi Yamagishi. "HMM-based text-to-articulatory-movement prediction and analysis of critical articulators." (2010).*

(Continued)

*Primary Examiner* — Sarah Le
(74) *Attorney, Agent, or Firm* — Fleit Intellectual Property Law; Donna Flores (57) ABSTRACT

According to an embodiment of the present invention, a computer-implemented method for modeling text-to-articulatory movement conversion is provided. In the method, text features are generated for a plurality of texts, wherein the text feature comprises a phoneme. Articulatory features are determined for the plurality of texts from a plurality of audio signals and a plurality of visual signals, wherein the audio signals record speeches of the plurality of texts, the visual signals record three-dimensional images of an articulator when speaking the plurality of texts, and the articulatory features indicate articulatory positions of the articulator in the speeches. A text-to-articulatory movement model is established with the text features as inputs and the articulatory features as outputs.

18 Claims, 6 Drawing Sheets

(56) References Cited

OTHER PUBLICATIONS

Chao, Linlin, et al. "Long short term memory recurrent neural network based multimodal dimensional emotion recognition." Proceedings of the 5th International Workshop on Audio/Visual Emotion Challenge. ACM, 2015.*

Kjellström, Hedvig, and Olov Engwall. "Audiovisual-to-articulatory inversion." Speech Communication 51.3 (2009): 195-209.*

Ding, Chuang, et al. "Automatic prosody prediction for Chinese speech synthesis using BLSTM-RNN and embedding features." Automatic Speech Recognition and Understanding (ASRU), 2015 IEEE Workshop on. IEEE, 2015.*

Erasmus, "The production of speech sounds", posted 2002, http://www.personal.rdg.ac.uk/~llsroach/phon2/artic-basics.htm (Year: 2002).*

Hasegawa-Johnson, Mark, et al. "Prosodic hierarchy as an organizing framework for the sources of context in phone-based and articulatory-feature-based speech recognition." Linguistic Patterns of Spontaneous Speech (2007) (Year: 2007).*

Black, A., et al., Articulatory Features for Expressive Speech Synthesis, Proceedings of the IEEE International Conference on Acoustics, Speech and Signal Processing, Mar. 25-30, 2012, pp. 1-4.

* cited by examiner

TEXT-TO-ARTICULATORY MOVEMENT

BACKGROUND

The present invention relates to animation synthesis technology, and more specifically, to text-to-articulatory movement conversion.

With respect to animation production, mouth animation synthesis of a character is important. It is desirable for the mouth animation synthesis that mouth movement of the character when speaking a text is consistent with the text. In the current animation production, the mouth movement usually relates to mouth open, mouth closed and activity of muscles around the mouth, which are two-dimensional movement information of the mouth. Usually the mouth movement may be represented by a number of mouth features.

In mouth animation synthesis, a pre-trained model for text to mouth features may be used to predict the mouth features based on a text. Then, the predicted mouth features may be used to reconstruct a mouth image. As the mouth features describe the 2-dimensional mouth movement, the reconstructed mouth image may not match the text accurately.

In addition, the model for text to mouth features is usually monolingual. In the case that the text is in a different language, the text may be translated into the same language as the model, and then the translated text is used to predict the mouth features. In this way, the synthesized mouth movement may not be consistent with the original text.

SUMMARY

According to one embodiment of the present invention, there is provided a computer-implemented method for modeling text-to-articulatory movement conversion. In the method, text features are generated for a plurality of texts, wherein the text feature comprises a phoneme. Articulatory features are determined for the plurality of texts from a plurality of audio signals and a plurality of visual signals, wherein the audio signals record speeches of the plurality of texts, the visual signals record three-dimensional images of an articulator when speaking the plurality of texts, and the articulatory features indicate articulatory positions of the articulator in the speeches. A text-to-articulatory movement model is established with the text features as inputs and the articulatory features as output.

According to another embodiment of the present invention, there is provided a computer-implemented method for articulatory movement synthesis. In the method, a text feature for a text is generated, wherein the text feature comprises a phoneme. Then an articulatory feature for the text is predicted based on the text feature using a text-to-articulatory movement model, wherein the articulatory feature indicates an articulatory position of an articulator when speaking the text. Articulatory movement is synthesized based on the articulatory feature. In the method, the text-to-articulatory movement model is established using a set of text features as inputs and a set of articulatory features as outputs. The set of text features is generated from a plurality of texts. The set of articulatory features is determined from a plurality of audio signals and a plurality of visual signals for the plurality of texts. The audio signals record speeches of the plurality of texts, and the visual signals record three-dimensional images of an articulator when speaking the plurality of texts.

According to another embodiment of the present invention, there is provided a system for modeling text-to-articulatory movement conversion. The system includes one or more processors, a memory coupled to at least one of the processors, and a set of computer program instructions stored in the memory and executed by at least one of the processors in order to perform actions of; generating text features for a plurality of texts, wherein the text feature comprises a phoneme; determining articulatory features for the plurality of texts from a plurality of audio signals and a plurality of visual signals, wherein the audio signals record speeches of the plurality of texts, the visual signals record three-dimensional images of an articulator when speaking the plurality of texts, and the articulatory features indicate articulatory positions of the articulator in the speeches; and establishing a text-to-articulatory movement model with the text features as inputs and the articulatory features as outputs.

According to another embodiment of the present invention, there is provided a system for articulatory movement synthesis. The system includes one or more processors, a memory coupled to at least one of the processors, and a set of computer program instructions stored in the memory and executed by at least one of the processors in order to perform actions of: generating a text feature for a text, wherein the text feature comprises a phoneme; predicting an articulatory feature for the text based on the text feature using a text-to-articulatory movement model, wherein the articulatory feature indicates an articulatory position of an articulator when speaking the text; and synthesizing articulatory movement based on the articulatory feature. In the system, the text-to-articulatory movement model is established using a set of text features as inputs and a set of articulatory features as outputs. The set of text features is generated from a plurality of texts. The set of articulatory features is determined from a plurality of audio signals and a plurality of visual signals for the plurality of texts, wherein the audio signals record speeches of the plurality of texts and the visual signals record three-dimensional images of an articulator when speaking the plurality of texts.

According to another embodiment of the present invention, there is provided a computer program product. The computer program product comprises a computer readable storage medium having program instructions embodied therewith. The program instructions are executable by a device to cause the device to generate text features for a plurality of texts, to determine articulatory features for the plurality of texts from a plurality of audio signals and a plurality of visual signals, and to establish a text-to-articulatory movement model with the text features as inputs and the articulatory features as outputs. The text feature comprises a phoneme. The audio signals record speeches of the plurality of texts. The visual signals record three-dimensional images of an articulator when speaking the plurality of texts. The articulatory features indicate articulatory positions of the articulator in the speeches.

According to another embodiment of the present invention, there is provided a computer program product. The computer program product comprises a computer readable storage medium having program instructions embodied therewith. The program instructions are executable by a device to cause the device to generate a text feature for a text, to predict an articulatory feature for the text based on the text feature using a text-to-articulatory movement model, and to synthesize articulatory movement based on the articulatory feature. The text feature comprises a phoneme. The articulatory feature indicates an articulatory position of an articulator when speaking the text. Moreover, the text-to-articulatory movement model is established using a set of text features as inputs and a set of articulatory features as outputs. The set of text features is generated from a plurality of texts. The set of articulatory features is determined from a plurality of audio signals and a plurality of visual signals for the plurality of texts. The audio signals record speeches of the plurality of texts and the visual signals record three-dimensional images of an articulator when speaking the plurality of texts.

BRIEF DESCRIPTION OF THE SEVERAL VIEWS OF THE DRAWINGS

Through the more detailed description of some embodiments of the present disclosure in the accompanying drawings, the above and other objects, features and advantages of the present disclosure will become more apparent, wherein the same reference generally refers to the same components in the embodiments of the present disclosure.

DETAILED DESCRIPTION

Some preferable embodiments will be described in more detail with reference to the accompanying drawings, in which the preferable embodiments of the present disclosure have been illustrated. However, the present disclosure can be implemented in various manners, and thus should not be construed to be limited to the embodiments disclosed herein. On the contrary, those embodiments are provided for the thorough and complete understanding of the present disclosure, and completely conveying the scope of the present disclosure to those skilled in the art.

Figure 1:
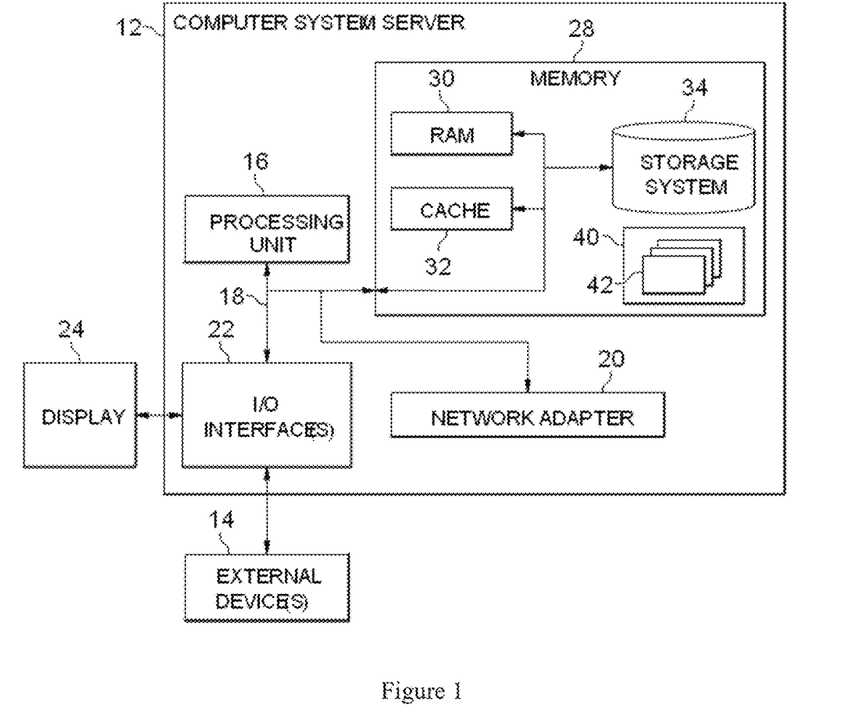
FIG. 1 shows an exemplary computer system which is applicable to implement embodiments of the present invention.

In FIG. 1, an exemplary computer system/server 12 which is applicable to implement the embodiments of the present invention is shown. Computer system/server 12 is only illustrative and is not intended to suggest any limitation as to the scope of use or functionality of embodiments of the invention described herein.

As shown in FIG. 1, computer system/server 12 is shown in the form of a general-purpose computing device. The components of computer system/server 12 may include, but are not limited to, one or more processors or processing units 16, a system memory 28, and a bus 18 that couples various system components including system memory 28 to processor 16.

Bus 18 represents one or more of any of several types of bus structures, including a memory bus or memory controller, a peripheral bus, an accelerated graphics port, and a processor or local bus using any of a variety of bus architectures. By way of example, and not limitation, such architectures include an Industry Standard Architecture (ISA) bus, a Micro Channel Architecture (MCA) bus, an Enhanced ISA (EISA) bus, a Video Electronics Standards Association (VESA) local bus, and a Peripheral Component Interconnect (PCI) bus.

Computer system/server 12 typically includes a variety of computer system readable media. Such media may be any available media that is accessible by computer system/server 12 and includes both volatile and non-volatile media, removable and non-removable media.

System memory 28 can include computer system readable media in the form of volatile memory, such as random access memory (RAM) 30 and/or cache memory 32. Computer system/server 12 may further include other removable/non-removable, volatile/non-volatile computer system storage media. By way of example only, storage system 34 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media, can be provided. In such instances, each can be connected to bus 18 by one or more data media interfaces. As will be further depicted and described below, memory 28 may include at least one program product having a set (e.g., at least one) of program modules that are configured to carry out the functions of embodiments of the invention.

Program/utility 40, having a set (at least one) of program modules 42, as well as an operating system, one or more application programs, other program modules, and program data, may be stored in memory 28 by way of example, and not limitation. Each of the operating system, one or more application programs, other program modules, and program data or some combination thereof, may include an implementation of a networking environment. Program modules 42 generally carry out the functions and/or methodologies of embodiments of the invention as described herein.

Computer system/server 12 may also communicate with one or more external devices 14 such as a keyboard, a pointing device, a display 24, etc.; one or more devices that enable a user to interact with computer system/server 12; and/or any devices (e.g., network card, modem, etc.) that enable computer system/server 12 to communicate with one or more other computing devices. Such communication can occur via Input/Output (I/O) interfaces 22. Still yet, computer system/server 12 can communicate with one or more networks such as a local area network (LAN), a general wide area network (WAN), and/or a public network (e.g., the Internet) via network adapter 20. As depicted, network adapter 20 communicates with the other components of computer system/server 12 via bus 18. It should be understood that although not shown, other hardware and/or software components could be used in conjunction with computer system/server 12. Examples, include, but are not limited to: microcode, device drivers, redundant processing units, external disk drive arrays, redundant array of independent disks (RAID) systems, tape drives, and data archival storage systems, etc.

Figure 2:
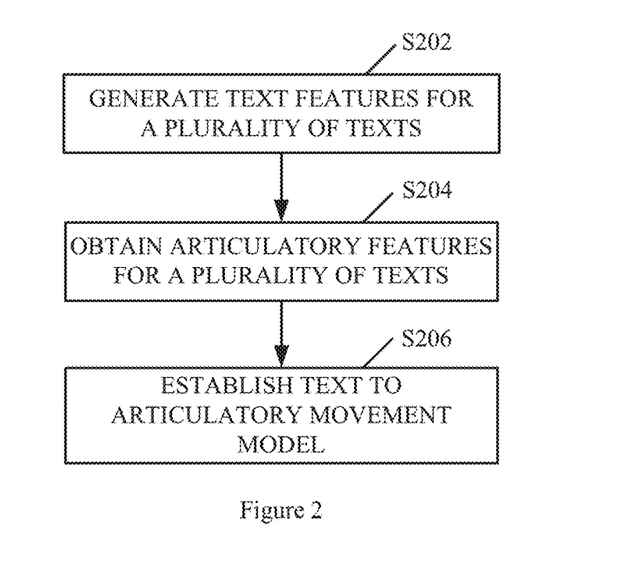
FIG. 2 is a flow chart of a method for modeling text-to-articulatory movement conversion according to an embodiment of the present invention.

FIG. 2 shows a flow chart of a method for modeling text-to-articulatory movement conversion according to an embodiment of the present invention. The embodiment will be described in detail in conjunction with the figures. A person skilled in the art will appreciate that the modeling of the text-to-articulatory movement conversion may be implemented by any kind of computing device, such as the computer system/server as shown in FIG. 1.

In the embodiment, the articulatory movement may be represented by a sequence of articulatory positions. Thus, the text-to-articulatory movement conversion means to convert a text into a sequence of articulatory positions for speaking the text. Based on the sequence of articulatory positions, mouth animation can be synthesized.

The modeling of the text-to-articulatory movement is based on texts and audio and visual information obtained when speaking the texts. Generally, the texts for modeling may be obtained from an existing corpus. The audio and visual information for a text may be obtained simultaneously when the text is spoken. The audio information may be represented by an audio signal which records a speech of the text. The visual information may be represented by a visual signal which records images of an articulator. Usually the articulator refers to a moveable speech organ. In one embodiment, the articulator may include lips (i.e. upper lip and lower lip), teeth (i.e. upper teeth and lower teeth), a tongue, and a palate. In some embodiments of the present invention, the articulator may further include any other speech organs. The visual signal for the text may be obtained by means of Electropalatography, Electromagnetic Articulography, or X-ray Cinematography when the text is spoken. Therefore, the visual information may describe 3-dimensional movement information of the mouth.

As shown in FIG. 2, at step S202, the computing device may generate text features for a plurality of texts. As described above, the texts may be obtained from an existing corpus and are known. In the embodiment, the text feature may be used to indicate features of a text in terms of linguistics. In this step, each of the plurality of texts will be analyzed to generate the text feature.

Figure 3:
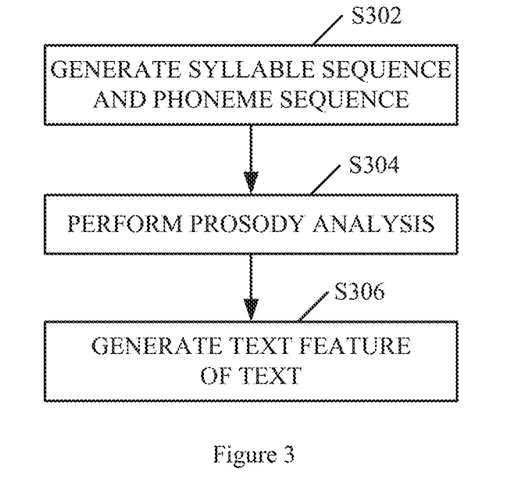
FIG. 3 is a flow chart illustrating an exemplary process of generating text features for the text.

FIG. 3 shows an exemplary process for generating the text feature for the text (step S202). At step S302, the computing device may generate a syllable sequence and a phoneme sequence for the text. As is known, a phoneme is the smallest speech unit for constituting a syllable. For example, the phoneme of Chinese may be represented by initials and finals, and the phoneme of English may be represented by phonetic symbols. In addition, a syllable of Chinese may include an initial and a final, and a pronunciation of a Chinese word is the syllable. A syllable of English may include a vowel or may include a vowel and one or more than one consonants, and the pronunciation of an English word may be one or more syllables. In the embodiment, the text may be a sentence or a phrase. The text may be segmented into words. Then the syllable for each word may be obtained, and thus the syllable sequence for the text may be generated. Moreover, each word may be converted into phonemes by Grapheme-to-Phoneme conversion, and the phoneme sequence for the text may be generated.

In an example, assume the text is "wo shi zhong guo ren" in Chinese. The generated syllable sequence of the text is "wo, shi, zhong, guo, ren", and the generated phoneme sequence is "w, o, sh, i, zh, ong, g, uo, r, en".

At step S304, the computing device may perform prosody analysis on the text. The prosody analysis may obtain prosody information of the text, such as prosody word and prosody phrase border, etc. In the embodiment, the prosody information may be represented in the form of one-hot code. The one-hot code is generally expressed as a vector consisting of a group of bits among which there is a single high (1) bit and all the others are low (0) bits. Assume a Chinese dictionary contains 180 initials and finals, and each initial and each final has a sequence number. With respect to the Chinese dictionary, the one-hot code for an initial or final is a 180-dimension vector. In the one-hot code for an initial or final, the bit corresponding to its sequence number is set to one (1), and other bits are set to zero (0). For the text "wo shi zhong guo ren", the prosody information may be represented by the one-hot codes of the related initials or finals.

At step S306, the computing device may generate the text feature of the text based on the phoneme sequence, the syllable sequence and the prosody information. In the embodiment, the text feature may include each phoneme in the phoneme sequence, the syllable in the syllable sequence to which each phoneme belongs, a word of the text to which each phoneme belongs, and the prosody information of the text. In the above example, assume the phoneme is "zh", the syllable to which the phoneme "zh" belongs is "zhong". As the pronunciation of a Chinese word is the syllable, the word to which the phoneme "zh" belongs is also "zhong".

Above steps S302 to S306 may be repeatedly performed on each of the texts to generate the text feature of each text.

Although FIG. 3 shows that steps S302 and S304 are executed sequentially, a person skilled in the art will appreciate that steps S302 and S304 may be performed concurrently or reversely.

Figure 4:
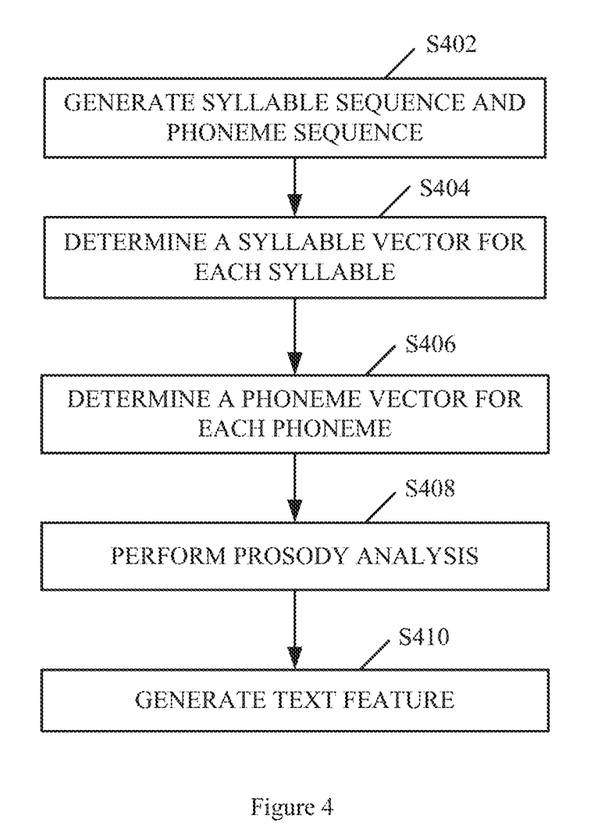
FIG. 4 is a flow chart illustrating another exemplary process of generating text features for the text.

FIG. 4 shows another exemplary process for generating the text feature for the text (step S202). In this exemplary process, context will be taken into account for the generation of the text feature, especially the context of each syllable and the context of each phoneme. Generally, the context of a syllable/phoneme may include the previous and/or next N syllables/phonemes of the syllable/phoneme, wherein N is a natural number. In the embodiment, N may be set to 1. In above example, the context of the syllable "zhong" includes the syllable "shi" and the syllable "guo", and the context of the phoneme "zh" includes the phoneme "i" and the phoneme "ong".

As shown in FIG. 4, at step S402, the computing device may generate the syllable sequence and the phoneme sequence for the text. The generation of the syllable sequence and the phoneme sequence is same as that in step S302.

At step S404, the computing device may determine a syllable vector for each syllable in the syllable sequence. The syllable vector is vector representation of the syllable. The syllable vector may be determined by means of a syllable to vector method which is similar to a Word2Vec method. As known, the Word2Vec method is to find a vector to present a word. In the feature space consisting of word vectors, the distance between two word vectors is related to the two words' context similarity. Similarly, the syllable to vector method is to find a new presentation vector to present a syllable, and such the presentation vector can present the syllable's context similarity. The syllable to vector method is substantially the same as the Word2Vec method and the difference is only that the word unit is replaced with the syllable unit.

At step S406, the computing device may determine a phoneme vector for each phoneme in the phoneme sequence. The phoneme vector is vector representation of the phoneme. The phoneme vector may be determined by means of a Phoneme2Vec method which is also similar to the Word2Vec method. In the embodiment, the Phoneme2Vec method is to find a new presentation vector to present a phoneme, and such the presentation vector can present the phoneme's context similarity. The Phoneme2Vec method is substantially same as the Word2Vec method and the difference is only that the word unit is replaced with the phoneme unit.

At step S408, the computing device may perform prosody analysis on the text. In this step, the prosody analysis may be same as that in step S304. Through the prosody analysis, the prosody information of the text may be obtained. In the embodiment, the prosody information may be represented in the form of one-hot code.

At step S410, the computing device may generate the text feature based on the phoneme sequence, the determined syllable vectors, the determined phoneme vectors and the prosody information. In this exemplary process, the text feature may include each phoneme in the phoneme sequence, the syllable vector of the syllable to which each phoneme belongs, the phoneme vector of each phoneme, and the prosody information of the text.

Above steps S402 to S410 are repeatedly performed on each of the texts, to generate the text feature of each text.

Although in FIG. 4 steps S404 to S408 are executed sequentially, a person skilled in the art will appreciate that steps S404 to S408 may be executed concurrently or conversely.

In some embodiments of the present invention, the text feature of the text may include the phonemes in the phoneme sequence only. In this case, the computing device may generate the phoneme sequence of the text only.

Returning to FIG. 2, at step S204, the computing device may determine articulatory features for the plurality of texts from a plurality of audio signals and a plurality of visual signals. As described above, the audio signal records the speech of the text, and the visual signal records the images of the articulator when the text is spoken. The audio signal and the visual signal may have the same length of duration. In the embodiment, the articulatory feature for the text may indicate an articulatory position of the articulator in the speech of the text.

Figure 5:
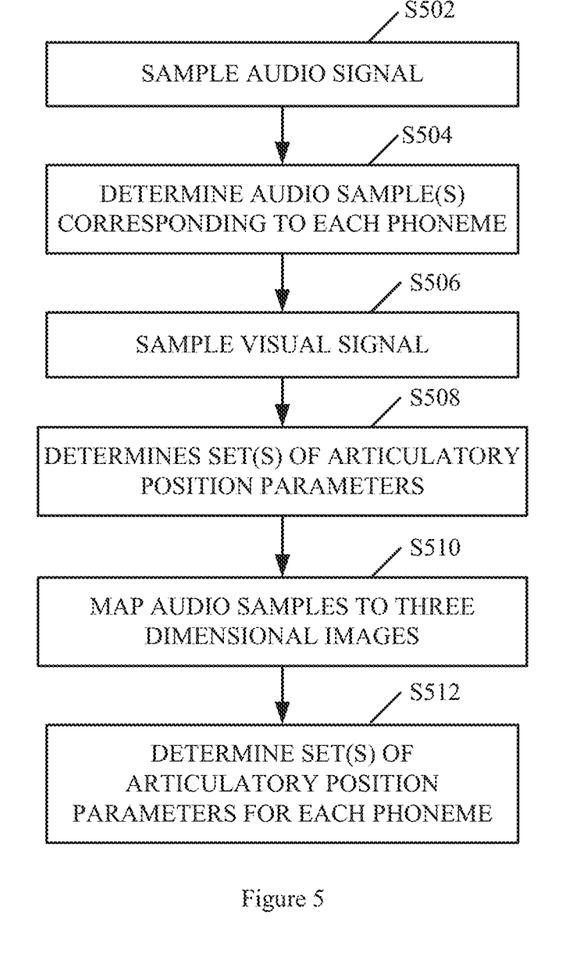
FIG. 5 is a flow chart illustrating a process of determining articulatory features for the text.

FIG. 5 shows a flow chart illustrating a process of determining articulatory features for the text (step S204). As shown in FIG. 5, at step S502, the computing device may sample the audio signal of the text. A sampling time for the audio signal may be varied as required. For example, the sampling time may be 10 milliseconds (ms). Assuming that the audio signal is 2 seconds long, 200 audio samples may be obtained.

Generally, the number of the audio samples is much larger than the number of the phonemes of the text, so the audio samples are aligned with the phonemes. At step S504, the computing device may determine at least one audio sample corresponding to each phoneme of the text. In this step, an acoustic model may be employed to determine similarities between the audio samples and group the audio samples to correspond to the phonemes.

At step S506, the computing device may sample the visual signal of the text to obtain a plurality of three-dimensional images. Thus, the visual signal becomes a sequence of three-dimensional images in time order. A sampling time for the visual signal may be varied as needed. In one embodiment, the sampling time for the visual signal may be same as that for the audio signal. Thus, each audio sample may have one visual image. In an example, the visual signal may be sampled with the sampling time of 10 ms, and a sequence of 200 visual images may be obtained for the visual signal with a length of 2 seconds. In some embodiments, the sampling time for the visual signal may be different from the sampling time for the audio signal.

Figure 6:
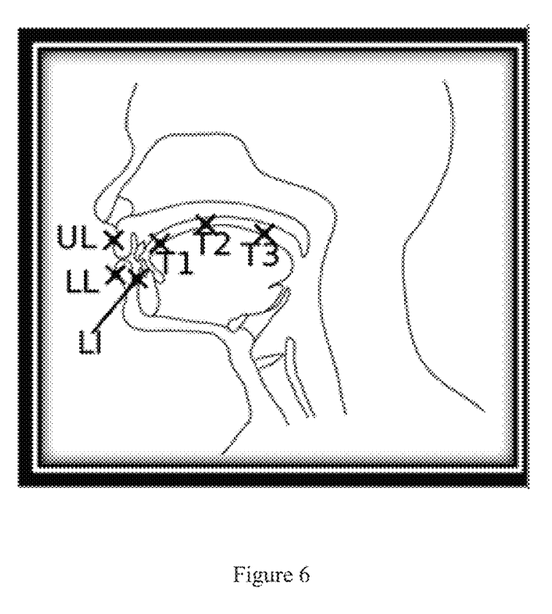
FIG. 6 is a diagram illustrating an example of the articulatory position parameters.

At step S508, the computing device may determine a plurality of sets of articulatory position parameters from the three-dimensional images. Each of the three-dimensional images may be processed to determine one set of articulatory position parameters. The articulatory position parameters may be defined as positions of different parts of the articulator. In some embodiments of the present invention, the articulator may include lips, teeth, a tongue and a palate. In this case, the articulatory position parameters may be an upper lip position (denoted as UL in FIG. 6), a lower lip position (denoted as LL in FIG. 6), a lower teeth position (denoted as LI in FIG. 6), a tongue tip position (denoted as T1 in FIG. 6), a lingual surface position (denoted as T2 in FIG. 6), and a tongue root position (denoted as T3 in FIG. 6). A person skilled in the art will appreciate that the articulatory position parameters may have other definitions. In the above example, 200 sets of articulatory position parameters may be determined.

In this step, the three-dimensional image may be firstly processed to obtain the values of the articulatory position parameters. The values of the articulatory position parameters may be normalized. During the normalization, a relatively fixed point in a face would be selected as a reference point. For example, a tip of nose may be considered as the reference point. The values of the articulatory position parameters may be normalized as the offset value relative to the reference point.

At step S510, the computing device may map the audio samples obtained at step S502 to the three-dimensional images obtained at step S506. The mapping may be performed by any existing method. Thus, each audio sample may correspond to one or more images. Through the above steps, each phoneme may correspond to one or more audio samples, and each audio sample may correspond to one or more images which corresponds to one or more sets of articulatory position parameters. Thus, each phoneme may correspond to one or more sets of articulatory position parameters. At step S512, the computing device may determine at least one set of articulatory position parameters for each phoneme. The determined set(s) of articulatory position parameters may be considered as the articulatory feature for the phoneme.

Above steps S502 to S512 are repeatedly performed on each text, and the articulatory features for the phonemes of the phoneme sequence of each text may be determined.

Although FIG. 5 shows that steps S502 to S508 are executed sequentially, a person skilled in the art will appreciate that steps S502 and S504 may be performed concurrently with steps S506, S508 or after steps S506, S508.

Returning to FIG. 2, at step S206, the computing device may establish a text-to-articulatory movement model. In the text-to-articulatory movement model, the text feature is used as an input and the articulatory feature for the phoneme is used as an output. In the embodiment, a neural network may be used as the text-to-articulatory movement model. Specifically, a Long Short Term Memory-Recurrent Neural Network (LSTM-RNN) based model may be used as the text-to-articulatory movement model. A person skilled in the art will appreciate that any other kind of model may be employed. The LSTM-RNN based model may be trained using the text features generated at step S202 as the input and the articulatory features for the phonemes obtained at step S204 as the output.

It can therefore be seen from the above description that the method for modeling text-to-articulatory movement conversion of the embodiment as shown in FIGS. 2 to 5 utilizes the three-dimensional movement information of the mouth to model the text-to-articulatory movement conversion, and can increase consistency of the text and the articulatory movement.

Figure 7:
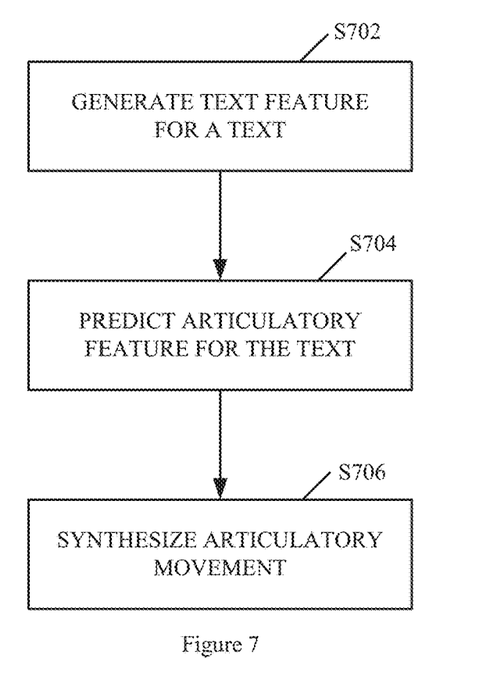
FIG. 7 is a flow chart of a method for articulatory movement synthesis according to an embodiment of the present invention.

FIG. 7 shows a flow chart of the method for articulatory movement synthesis according to an embodiment of the present invention. The embodiment will be described in detail in conjunction with the figure. A person skilled in the art will appreciate that the articulatory movement synthesis may be implemented by any kind of computing device, such as the computer system/server as shown in FIG. 1.

As shown in FIG. 7, at step S702, the computing device may generate a text feature for a text. In this step, the text feature may be generated as shown in FIG. 3 or FIG. 4. As described above, the text feature may indicate the features of the text in terms of linguistics.

In one embodiment, the computing device may generate a syllable sequence and a phoneme sequence corresponding to the text, and perform the prosody analysis on the text to obtain the prosody information. The generation process of the syllable sequence and the phoneme sequence and the process of the prosody analysis have been described in detail above. The computing device may generate the text feature based on the phoneme sequence, the syllable sequence and the prosody information. The text feature may include each phoneme in the phoneme sequence, the syllable in the syllable sequence to which each phoneme belongs, a word of the text to which each phoneme belongs, and the prosody information of the text.

In another embodiment, the computing device may only generate the phoneme sequence corresponding to the text. The text feature may only include the phonemes in the phoneme sequence.

In another embodiment, the computing device may generate a syllable sequence and a phoneme sequence corresponding to the text, and perform the prosody analysis on the text to obtain the prosody information. The computing device may determine the syllable vector for each syllable of the syllable sequence, and may determine the phoneme vector for each phoneme of the phoneme sequence. The syllable vector may be determined using the Word2Vec method, for example. The phoneme vector may be determined using the Phoneme2Vec method, for example. The computing device may generate the text feature based on the phoneme sequence, the syllable vectors, the phoneme vectors and the prosody information. The text feature may include each phoneme in the phoneme sequence, the syllable vector of the syllable to which each phoneme belongs, the phoneme vector of each phoneme, and the prosody information of the text.

At step S704, the computing device may use a text-to-articulatory movement model to predict the articulatory feature for the text based on the text feature generated by step S702. In one embodiment, the text-to-articulatory movement model may be established by the method as shown in FIGS. 2 to 5. As described above, the text-to-articulatory movement model may be the LSTM-RNN based model. The predicted articulatory feature indicates the articulatory positions of the articulator when speaking the text. The articulator may include the lips, the teeth, the tongue, and the palate.

At step S706, the computing device may synthesize the articulatory movement based on the predicted articulatory feature. The synthesis of the articulatory movement is known to a person skilled in the art and its details will be omitted herein.

It can be seen from the above description that the method for articulatory movement synthesis of the embodiment as shown in FIG. 7 can predict the three-dimensional movement information of the mouth based on the text and can synthesize the articulatory movement which is consistent with the text.

Figure 8:
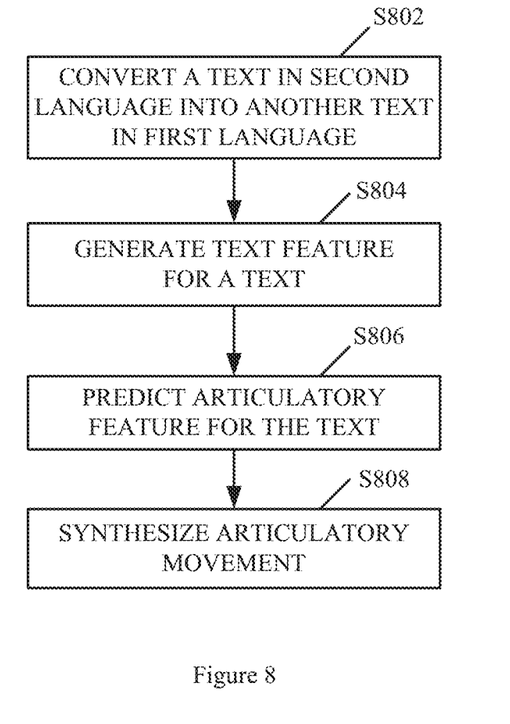
FIG. 8 is a flow chart of a method for articulatory movement synthesis according to another embodiment of the present invention.

FIG. 8 shows a flow chart of the method for articulatory movement synthesis according to another embodiment of the present invention. Usually, the text-to-articulatory movement model is monolingual, and correspondingly it is advantageous that the text is in the same language as the text-to-articulatory movement model. This embodiment may be applicable to the case where the text is in different language.

Assume that the text-to-articulatory movement model is for a first language, and the text for the articulatory movement synthesis is in a second language. At step S802, the computing device may convert the text in the second language into another text in the first language, such that the pronunciation of the converted text is substantially same as that of the text in the second language. As is known, the pronunciation of a certain word in one language may be similar to the pronunciation of a certain word in another language, and accordingly, the articulatory position of the articulator may be same when speaking the two words. Thus the words of the text in the second language may be replaced with the words in the first language, so as to generate the text in the first language.

The generated text in the first language may be used to generate the text feature at step S804. At step S806, the articulatory feature may be predicted based on the text feature using the text-to-articulatory movement model. At step S808, the articulatory movement may be synthesized using the predicted articulatory feature. Steps S804, 806 and 808 are the same as steps S702, 704 and 706 as shown in FIG. 7.

It can be seen from the above description that the method for articulatory movement synthesis of the embodiment as shown in FIG. 8 can further support multiple languages.

Figure 9:
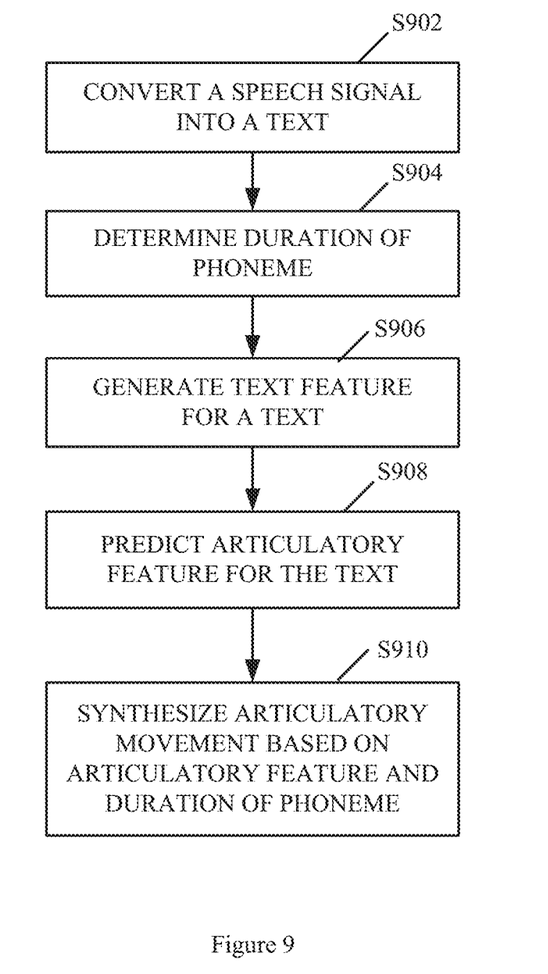
FIG. 9 is a flow chart of a method for articulatory movement synthesis according to still another embodiment of the present invention.

FIG. 9 shows a flow chart of the method for articulatory movement synthesis according to still another embodiment of the present invention. In this embodiment, the input for the articulatory movement synthesis is a speech signal, and the text may be obtained by means of speech recognition.

As shown in FIG. 9, at step S902, the computing device may convert the speech signal into a text. The existing speech recognition method may be used. At step S904, the computing device may determine duration of phoneme for the text from the speech signal. In this step, the text may be analyzed to obtain the phoneme sequence, and the duration of each phoneme may be determined according to the speech signal.

The computing device may generate the text feature for the text at step S906, and predict the articulatory feature based on the text feature at step S908. At step S910, the computing device may use the predicted articulatory feature and the duration of phoneme determined at step S904 to synthesize the articulatory movement.

It should be noted that steps S904 and S906 may be performed sequentially or concurrently.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A computer-implemented method comprising:
generating text features for a plurality of texts in a first language, each text feature comprising at least one phoneme and prosody information;
determining articulatory features for the plurality of texts from a plurality of audio signals and a plurality of visual signals, the audio signals recording speeches of the plurality of texts, the visual signals recording three-dimensional images of an articulator when speaking the plurality of texts, and the articulatory features indicating articulatory positions of the articulator in the speeches, the articulatory positions including positions of upper and lower lips, upper and lower teeth, a tongue and a palate, the determining comprising, for each text of the plurality of texts:
sampling the audio signal of the text;
determining at least one audio sample corresponding to respective phonemes of the text;
sampling the visual signal of the text to obtain three-dimensional images;
determining a set of articulatory position parameters from each of the three-dimensional images;
mapping the at least one audio sample to the three-dimensional images; and
determining at least one set of articulatory position parameters corresponding to the respective phonemes as the articulatory feature for the phoneme;
establishing a text-to-articulatory movement model in the first language with the text features as inputs and the articulatory features as outputs;
converting a new text in a second language into a converted text in the first language such that a pronunciation of the converted text is similar to that of the new text;
generating at least one text feature for the new text using the converted text; and
predicting an articulatory feature for the new text based on the at least one text feature using the text-to-articulatory movement model.

2. The method according to claim 1, wherein generating text features for a plurality of texts comprises:
for each of the plurality of texts:
generating a phoneme sequence corresponding to the text; and
generating the text feature which comprises the phonemes in the phoneme sequence.

3. The method according to claim 2, wherein generating text features for a plurality of texts further comprises:
for each of the plurality of texts:
generating a syllable sequence corresponding to the text;
performing prosody analysis on the text to generate prosody information; and
generating the text feature which comprises the phonemes in the phoneme sequence, the syllable in the syllable sequence to which each of the phonemes belongs, a word of the text to which each of the phonemes belongs, and the prosody information of the text.

4. The method according to claim 1 wherein generating text features for a plurality of texts comprises:
for each of the plurality of texts:
generating a syllable sequence and a phoneme sequence corresponding to the text;
determining a syllable vector for respective syllables of the syllable sequence;
determining a phoneme vector for respective phonemes of the phoneme sequence;
performing prosody analysis on the text to generate prosody information; and
generating the text feature which comprises the phonemes in the phoneme sequence, the syllable vector of the syllable to which each of the phonemes belongs, the phoneme vector of each of the phonemes, and the prosody information of the text.

5. The method according to claim 1, wherein the text-to-articulatory movement model is a Long Short Term Memory—Recurrent Neural Network based model.

6. A computer-implemented method comprising:
generating a text feature for a first text, the text feature comprising a phoneme and prosody information;
determining an articulatory feature for the first text, based on the text feature, using a text-to-articulatory movement model in the first language, wherein the articulatory feature indicates an articulatory position of an articulator when speaking the text, the articulatory positions including positions of upper and lower lips, upper and lower teeth, a tongue and a palate, the determining comprising:
sampling the audio signal of the first text;
determining at least one audio sample corresponding to respective phonemes of the first text;
sampling the visual signal of the first text to obtain three-dimensional images;
determining a set of articulatory position parameters from each of the three-dimensional images;
mapping the at least one audio sample to the three-dimensional images; and
determining at least one set of articulatory position parameters corresponding to the respective phonemes as the articulatory feature for the phoneme;
converting a second text in a second language into a converted text in the first language such that a pronunciation of the converted text is similar to that of the second text;
generating at least one text feature for the second text using the converted text;
predicting an articulatory feature for the second text based on the at least one text feature using the text-to-articulatory movement model; and
synthesizing articulatory movement based on the articulatory feature
wherein the text-to-articulatory movement model is established using a set of text features as inputs and a set of articulatory features as outputs, and wherein the set of text features is generated from a plurality of texts, the set of articulatory features is determined from a plurality of audio signals and a plurality of visual signals for the plurality of texts, the audio signals recording speeches of the plurality of texts, the visual signals recording three-dimensional images of an articulator when speaking the plurality of texts.

7. The method according to claim 6, wherein generating a text feature for a first text comprises:
generating a phoneme sequence corresponding to the first text; and
generating the text feature which comprises the phonemes in the phoneme sequence.

8. The method according to claim 7, wherein generating a text feature for a first text further comprises:
generating a syllable sequence corresponding to the first text;

performing prosody analysis on the first text to generate prosody information; and generating the text feature which comprises each phoneme in the phoneme sequence, the syllable in the syllable sequence to which each phoneme belongs, a word of the first text to which each phoneme belongs, and the prosody information of the first text.

9. The method according to claim 6, wherein generating a text feature for a first text comprises:

generating a syllable sequence and a phoneme sequence corresponding to the first text;

determining a syllable vector for respective syllables of the syllable sequence;

determining a phoneme vector for respective phonemes of the phoneme sequence;

performing prosody analysis on the first text to generate prosody information; and generating the text feature which comprises each phoneme in the phoneme sequence, the syllable vector of the syllable in the syllable sequence to which each phoneme belongs, the phoneme vector of each phoneme, and the prosody information of the first text.

10. The method according to claim 6, wherein the text-to-articulatory movement model is a Long Short Term Memory—Recurrent Neural Network based model.

11. The method according to claim 6, further comprising:
converting a speech signal into a text; and
determining, for the text, duration of phoneme from the speech signal; and
wherein the articulatory movement is synthesized based on the articulatory feature and the duration of phoneme.

12. A system comprising:
one or more processors;
a memory coupled to at least one of the processors;
a set of computer program instructions stored in the memory and executed by at least one of the processors in order to perform actions of:
generating text features for a plurality of texts, each text feature comprising a phoneme and prosody information;
determining articulatory features for the a plurality of texts from a plurality of audio signals and a plurality of visual signals, the audio signals recording speeches of a plurality of texts, the visual signals recording three-dimensional images of an articulator when speaking the plurality of texts, and the articulatory features indicating articulatory positions of the articulator in the speeches, the articulatory positions including positions of upper and lower lips, upper and lower teeth, a tongue and a palate, the determining comprising, for each text of the plurality of texts:
sampling the audio signal of the text;
determining at least one audio sample corresponding to respective phonemes of the text;
sampling the visual signal of the text to obtain three-dimensional images;
determining a set of articulatory position parameters from each of the three-dimensional images;
mapping the at least one audio sample to the three-dimensional images; and
determining at least one set of articulatory position parameters corresponding to the respective phonemes as the articulatory feature for the phoneme; and
establishing a text-to-articulatory movement model in the first language with the text features as inputs and the articulatory features as outputs;

converting a new text in a second language into a converted text in the first language such that a pronunciation of the converted text is similar to that of the new text;

generating at least one text feature for the new text using the converted text; and predicting an articulatory feature for the new text based on the at least one text feature using the text-to-articulatory movement model.

13. The system according to claim 12, wherein the set of computer program instructions is executed by at least one of the processors in order to generate text features for a plurality of texts by:
for each of the plurality of texts:
generating a syllable sequence and a phoneme sequence corresponding to the first text;
performing prosody analysis on the text to generate prosody information; and
generating the text feature which comprises each phoneme in the phoneme sequence, a syllable in the syllable sequence to which the phoneme belongs, a word of the first text to which the phoneme belongs, and the prosody information of the text.

14. The system according to claim 12, wherein the set of computer program instructions is executed by at least one of the processors in order to generate text features for a plurality of texts by:
for each of the plurality of texts:
generating a syllable sequence and a phoneme sequence corresponding to the text;
determining a syllable vector for respective syllables of the syllable sequence;
determining a phoneme vector for respective phonemes of the phoneme sequence;
performing prosody analysis on the text to generate prosody information; and
generating the text feature which comprises each phoneme in the phoneme sequence, the syllable vector of the syllable to which each phoneme belongs, the phoneme vector of each phoneme, and the prosody information of the text.

15. A system comprising:
one or more processors;
a memory coupled to at least one of the processors;
a set of computer program instructions stored in the memory and executed by at least one of the processors in order to perform actions of:
generating a text feature for a first text, the text feature comprising a phoneme and prosody information;
determining an articulatory feature for the first text based on the text feature, using a text-to-articulatory movement model in a first language, wherein the articulatory feature indicates an articulatory position of an articulator when speaking the text, the articulatory positions including positions of upper and lower lips, upper and lower teeth, a tongue and a palate, the determining comprising:
sampling the audio signal of the first text;
determining at least one audio sample corresponding to respective phonemes of the first text;
sampling the visual signal of the first text to obtain three-dimensional images;
determining a set of articulatory position parameters from each of the three-dimensional images;

mapping the at least one audio sample to the three-dimensional images; and determining at least one set of articulatory position parameters corresponding to the respective phonemes as the articulatory feature for the phoneme;

converting a second text in a second language into a converted text in the first language such that a pronunciation of the converted text is similar to that of the second text;

generating at least one text feature for the second text using the converted text;

predicting an articulatory feature for the second text based on the at least one text feature using the text-to-articulatory movement model; and synthesizing articulatory movement based on the articulatory feature;

wherein the text-to-articulatory movement model is established using a set of text features as inputs and a set of articulatory features as outputs, and wherein the set of text features is generated from a plurality of texts, the set of articulatory features is determined from a plurality of audio signals and a plurality of visual signals for the plurality of texts, the audio signals recording speeches of the plurality of texts, the visual signals recording three-dimensional images of an articulator when speaking the plurality of texts wherein the plurality of visual signals has a different sampling time than the plurality of audio signals.

16. The system according to claim 15, wherein the set of computer program instructions is executed by at least one of the processors in order to generate a text feature for a first text by:

generating a syllable sequence and a phoneme sequence corresponding to the first text;

performing prosody analysis on the first text to generate prosody information; and generating the text feature which comprises each phoneme in the phoneme sequence, a syllable in the syllable sequence to which each phoneme belongs, a word of the first text to which each phoneme belongs, and the prosody information of the first text.

17. A computer program product comprising a non-transitory computer readable storage medium having program instructions embodied therewith, the program instructions executable by a device to cause the device to:

generate text features for a plurality of texts in a first language, each text feature comprising at least one phoneme and prosody information;

determine articulatory features for the plurality of texts from a plurality of audio signals and a plurality of visual signals, the audio signals recording speeches of a-plurality of texts, the visual signals recording three-dimensional images of an articulator when speaking the plurality of texts, and the articulatory features indicating articulatory positions of the articulator in the speeches, the articulatory positions including positions of upper and lower lips, upper and lower teeth, a tongue and a palate, the determining comprising, for each text in the plurality of texts:

sampling the audio signal of the text;

determining at least one audio sample corresponding to respective phonemes of the text;

sampling the visual signal of the text to obtain three-dimensional images;

determining a set of articulatory position parameters from each of the three-dimensional images;

mapping the at least one audio sample to the three-dimensional images; and determining at least one set of articulatory position parameters corresponding to the respective phonemes as the articulatory feature for the phoneme;

establish a text-to-articulatory movement model in the first language with the text features as inputs and the articulatory features as outputs;

convert a new text in a second language into a converted text in the first language such that a pronunciation of the converted text is similar to that of the new text;

generate at least one text feature for the new text using the converted text; and predict an articulatory feature for the new text based on the at least one text feature using the text-to-articulatory movement model.

18. A computer program product comprising a non-transitory computer readable storage medium having program instructions embodied therewith, the program instructions executable by a device to cause the device to:

generate a text feature for a first text, the text feature comprising a phoneme and prosody information;

determine an articulatory feature for the first text based on the text feature, using a text-to-articulatory movement model in a first language, wherein the articulatory feature indicates an articulatory position of an articulator when speaking the text, the articulatory positions including positions of upper and lower lips, upper and lower teeth, a tongue and a palate, the determining comprising:

sampling the audio signal of the first text;

determining at least one audio sample corresponding to respective phonemes of the first text;

sampling the visual signal of the first text to obtain three-dimensional images;

determining a set of articulatory position parameters from each of the three-dimensional images;

mapping the at least one audio sample to the three-dimensional images; and determining at least one set of articulatory position parameters corresponding to the respective phonemes as the articulatory feature for the phoneme;

convert a second text in a second language into a converted text in the first language such that a pronunciation of the converted text is similar to that of the second text;

generate at least one text feature for the second text using the converted text;

predict an articulatory feature for the second text based on the at least one text feature using the text-to-articulatory movement model; and synthesize articulatory movement based on the articulatory feature;

wherein the text-to-articulatory movement model is established using a set of text features as inputs and a set of articulatory features as outputs, and wherein the set of text features is generated from a plurality of texts, the set of articulatory features is determined from a plurality of audio signals and a plurality of visual signals for the plurality of texts, the audio signals recording speeches of the plurality of texts, the visual signals recording three-dimensional images of an articulator when speaking the plurality of texts wherein the plurality of visual signals has a different sampling time than the plurality of audio signals.

* * * * *